(12) United States Patent
MacDonald et al.

(10) Patent No.: US 9,235,413 B1
(45) Date of Patent: Jan. 12, 2016

(54) AUTOMATED CONTROL OF SEMICONDUCTOR WAFER MANUFACTURING BASED ON ELECTRICAL TEST RESULTS

(75) Inventors: William MacDonald, Mansfield, TX (US); George Logsdon, Arlington, TX (US); Matthew Lascom, Arlington, TX (US); Steven Craig Gessler, Arlington, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 2066 days.

(21) Appl. No.: 11/196,364

(22) Filed: Aug. 3, 2005

(51) Int. Cl.
*G06F 9/00* (2006.01)
*G05B 23/00* (2006.01)
*G05B 23/02* (2006.01)

(52) U.S. Cl.
CPC ....... *G06F 9/00* (2013.01); *G05B 23/00* (2013.01); *G05B 23/02* (2013.01)

(58) Field of Classification Search
CPC ............................ G05B 23/00; G05B 23/0224
See application file for complete search history.

(56) References Cited

U.S. PATENT DOCUMENTS

| | | | |
|---|---|---|---|
| 6,430,456 B1 * | 8/2002 | Black et al. | 700/110 |
| 7,072,730 B2 * | 7/2006 | Kobayashi et al. | 700/100 |
| 7,296,103 B1 * | 11/2007 | Purdy et al. | 710/106 |
| 2007/0004051 A1 * | 1/2007 | Okumoto et al. | 438/5 |

OTHER PUBLICATIONS www.merriam-webster.com—definition of "process".*

* cited by examiner

*Primary Examiner* — Jae Lee
(74) *Attorney, Agent, or Firm* — Jacqueline J. Garner; Frank D. Cimino

(57) ABSTRACT

In semiconductor wafer manufacturing, processes such as analyzing test data associated with semiconductor wafers, interpreting the test data analysis, and acting on the test data interpretation and analysis are automated. Such automation can eliminate delays that were previously imposed by the action of test analysis engineers and wafer fabrication personnel, thereby reducing the amount of useless material that is produced before a process defect can be detected.

14 Claims, 3 Drawing Sheets

AUTOMATED CONTROL OF SEMICONDUCTOR WAFER MANUFACTURING BASED ON ELECTRICAL TEST RESULTS

TECHNICAL FIELD OF THE INVENTION

The invention relates generally to manufacturing processes and, more particularly, to complex manufacturing processes such as manufacturing integrated circuits.

BACKGROUND OF THE INVENTION

Most semiconductor integrated circuit manufacturing processes have some form of unit process output that can be monitored at the process step to ensure that the manufacturing tool is functioning properly. Sheet resistance is one example of a unit process output that can be monitored and measured at the process step.

However, some process outputs cannot be measured at the process step; because the complete testing structure has not been constructed. For example, in wafer level reliability (WLR) testing of certain oxides, for example gate oxides and tunnel oxides, it may take several days to complete the structure that will actually be used to test the oxide. As an illustrative example, an oxidation process may be followed sequentially by a polysilicon deposition process, a polysilicon doping process, a photolithography process, and an etching process, all of which must be performed to provide the structure necessary for WLR testing of the oxide. Due to the aforementioned four additional process steps which must be performed before the oxide can be tested, several days can elapse between the oxidation process and the electrical testing of the oxide produced by that process.

Moreover, and continuing with the aforementioned oxide example, even after electrical testing of the oxide has been performed, a test analysis engineer must then analyze and interpret the electrical test data and then determine and implement an action plan. For example, if the test analysis engineer determines from the test data that a particular tool involved in the oxidation process is not performing properly, the engineer can inform personnel in control of the wafer fabrication process that the particular tool should be removed from the manufacturing process, whereupon tool repair, tool replacement or other appropriate action can be taken.

As demonstrated above, even after the electrical testing has been completed, a significant additional amount of time can be required for the test analysis engineer to perform the test data analysis and interpretation, and then to communicate an appropriate recommendation to the wafer fabrication personnel, and then for the wafer fabrication personnel to receive the recommendation and ultimately take the necessary step(s) to remove the tool from the process flow. It is therefore not uncommon for at least an additional day to elapse between the completion of the electrical testing and the removal of a defective tool from the manufacturing process.

As demonstrated by the foregoing example, a significant amount of time (several days) can elapse before any determination that the aforementioned oxidation process is defective and should be shut down. During this entire amount of elapsed time, i.e., for several days, the oxidation process continues to operate, thereby potentially producing several days' worth of defective, useless material. This of course translates directly into a financial loss, the magnitude of which can easily reach hundreds of thousands of dollars for some processes.

It is desirable in view of the foregoing to reduce the time that elapses between the performance of a semiconductor manufacturing process step and the detection of a defect in that process step.

SUMMARY OF THE INVENTION

Exemplary embodiments of the invention automate processes such as analyzing test data associated with semiconductor wafers, interpreting the test data analysis, and acting on the test data interpretation and analysis. Such automation can eliminate delays that were previously imposed by the action of test analysis engineers and wafer fabrication personnel, thereby reducing the amount of useless material that is produced before a process defect can be detected.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation. A controller may be implemented in hardware, firmware or software, or some combination of at least two of the same. It should be noted that the functionality associated with a controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed herein, and the various embodiments used to describe the principles of the present invention in this patent document are by way of illustration only and should not be construed in any way to limit the scope of the invention. Those skilled in the art will understand that the principles of the present invention may be implemented in any suitably arranged system.

Figure 1:
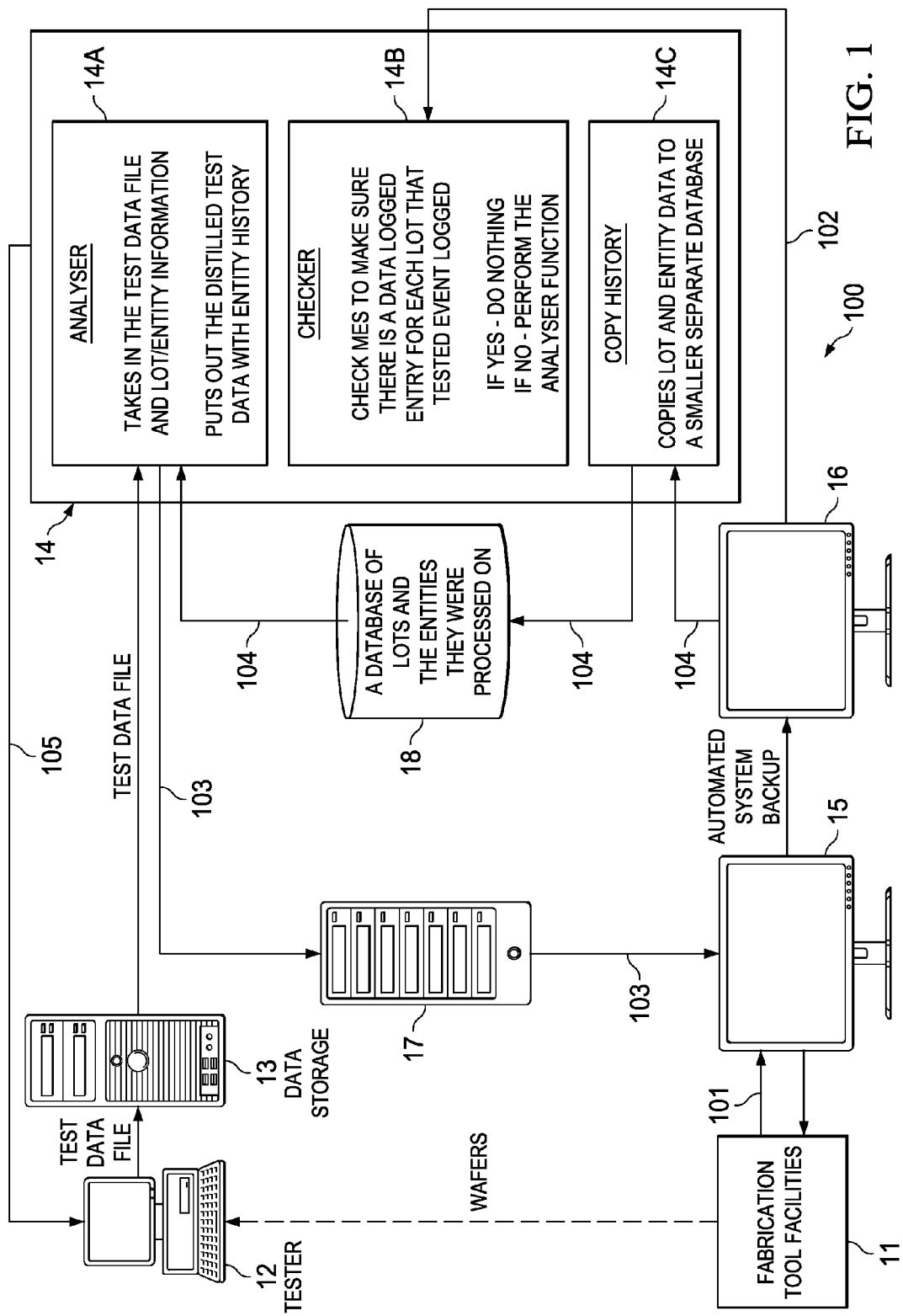
FIG. 1 diagrammatically illustrates an apparatus for manufacturing semiconductor wafers according to exemplary embodiments of the invention.

FIG. 1 diagrammatically illustrates pertinent portions of a semiconductor wafer manufacturing apparatus 100 according to exemplary embodiments of the invention. The apparatus 100 of FIG. 1 includes fabrication tool facilities designated generally at 11. This represents any number of wafer fabrication tools which can be combined in any number of combinations of any size to define sequences of fabrication tools. Any given fabrication tool can perform an associated process step of a semiconductor wafer fabrication process, and any number of the fabrication tools can be used together in sequence to perform a composite semiconductor wafer fabrication process whose constituent process steps are respectively defined by the fabrication tools included in that fabrication tool sequence. The above-described use of wafer fabrication tools in wafer fabrication plants is well known in the art.

Each semiconductor wafer manufacturing process implemented at 11 produces semiconductor wafers in groups typically referred to as lots. A given wafer lot is physically transported (either manually or by automated conveyance) to a tester 12 which performs electrical tests on the wafers of each lot of wafers that it receives.

The electrical tests may be performed on all of the lots (or on all of the wafers in a lot). This is one hundred percent (100%) sampling. The electrical tests may also be performed on some of the lots. The electrical tests may also be performed on some of the wafers in a lot. This is less than one hundred percent (100%) sampling. The sample size for the electrical tests may be changed at any time during the testing process.

A manufacturing execution system (MES) 15 receives event information 101 from the fabrication tool facilities 11. This event information 101 permits the MES 15 to track all activities performed by the fabrication tool facilities 11. This provision of event information from fabrication tool facilities 11 to an MES is well known in the art. Among the event information provided at 101 is information which identifies when processing of a particular wafer lot has been completed, together with an identifier for identifying that lot, and a listing of the fabrication tool (or tools) that were used to process the wafers of that lot (together with the sequence in which the tools were used). Herein, the terms "fabrication entity" or "fab entity" or simply "entity" are also used to refer to a fabrication tool (or simply "tool") within the fabrication tool facilities 11. Also herein, the term "wafer lot identification information" refers to information that indicates both the identifier of the wafer lot, and the fab entity or fab entities (and their sequence of use) which produced the wafer lot.

In embodiments where the wafer lots are manually transported to the tester 12, the wafer lot identification information is manually input into the tester 12 at the time that the wafer lot is delivered. In embodiments that convey the wafer lots automatically from the fabrication tool facilities 11 to the tester 12, the corresponding wafer lot identification information can be automatically provided from the MES 15 to the tester 12 (not explicitly shown in FIG. 1).

Test data produced by the tester 12 during the testing process is output from the tester in a test data file that is stored in a data storage server 13, from which it is ultimately retrieved by a data processing apparatus 14 (a suitably programmed desktop engineering computer workstation in some embodiments) which analyzes the test data. The data processor 14 receives at 104 wafer lot identification information from the MES 15 (via a backup server 16). The backup server 16 is provided in some embodiments as an up to the minute mirror of certain MES information and is used to answer queries and generally to lighten the processing load on the MES 15 (but is omitted in other embodiments, in favor of direct communication with MES 15). In response to the test data file and the information 104 provided by the MES 15, the data processor 14 produces test data analysis result information 103, which is transferred to the MES via a server 17. The server 17 is provided in some embodiments as a safety interface for the MES 15 (but is omitted in other embodiments, in favor of direct communication with MES 15).

The MES 15 interprets the test data analysis information 103, to determine which, if any, fabrication tool(s) should be removed from the wafer manufacturing process that produced the wafer lot associated with the information 103. If so, the MES 15 outputs to the fabrication tool facilities 11 control information 106 which controls the fabrication tool facilities to automatically make the fabrication tool(s) unavailable to the wafer manufacturing process that produced the wafer lot. For example, the MES 15 may send control information 106 to simply shut down the tool(s) in facilities 11 that may be responsible for producing a defective wafer lot.

It can be seen from the foregoing description that the system components designated generally at 14 and 15 in FIG. 1, together with their interconnections for communication with one another, provide a feedback controller within a feedback control loop that receives the test data generated by the tester 12 and, in response to the received test data, can automatically remove a given fabrication tool or tools from operation in the wafer manufacturing process used to produce the wafer lots associated with the received test data.

In some embodiments, the control information 106 causes a given fabrication tool to be removed only from operation in a wafer manufacturing process that has been determined to be defective because of that tool's operation, but the information 106 can indicate that the tool may still be utilized in other fabrication tool sequences associated with other wafer manufacturing processes. In other embodiments, the information at 106 directs the facilities 11 to remove from operation all fabrication tools that define the wafer manufacturing process that has been determined to be defective. In some embodiments, all of the fabrication tools associated with the defective process are removed from operation in the defective process only, and are permitted to remain available for use in other wafer manufacturing processes. In some embodiments, all fabrication tools are removed from the defective process, some of the removed fabrication tools are permitted to be used in other wafer manufacturing processes, and others of the removed fabrication tools are not permitted to be used in any other wafer manufacturing processes.

Figure 2:
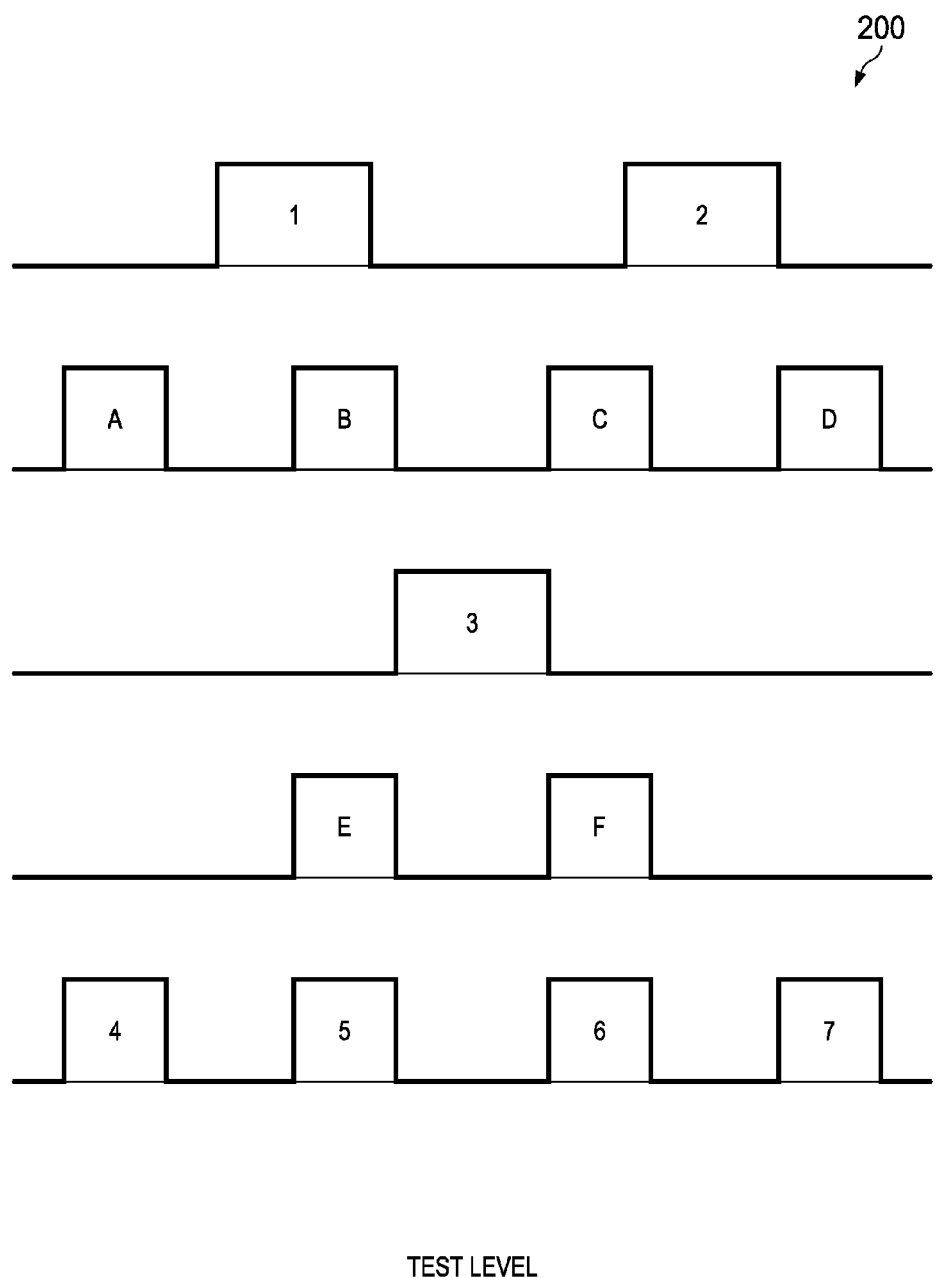
FIG. 2 diagrammatically illustrates a plurality of separate steps of an exemplary semiconductor wafer manufacturing process.

For example, consider the diagram 200 shown in FIG. 2. The first level illustrates two processing elements (1 and 2). Processing elements 1 and 2 could represent two different wetdecks. Assume that a wafer lot has been processed by processing element 1. Then the wafer lot passes to one of the processing elements on the next level. Level two comprises four processing elements A through D. Assume that the wafer lot is processed on the second level with processing element A.

Then the wafer lot passes to the third level. The wafer lot is processed by processing element 3, the only processing element on the third level. Then the wafer lot passes to the fourth level which comprises the processing elements E and F. Assume that the wafer lot is processed by processing element E. Then the wafer lot passes to the fifth level which comprises processing elements 4 through 7. Assume that the wafer lot is processed by processing element 4. Then the wafer lot passes to the sixth level which is the test level.

The electrical tests that are performed on samples at the test level indicate that the wafer lots that passed through the described path are being fabricated correctly. Now assume that the electrical tests are performed on a wafer lot that has a different path and deficiencies in the samples are found. Assume that the different path is the same as the first path except that the deficient wafer lots passed through processing element D on the second level.

It is only necessary to inactivate processing element D on the second level. It is not necessary to inactivate any of the other processing elements (1, 3, E and 4) because they are presumed to be operating correctly in view of the good quality of the wafer lots that are being produced in the first path. Processing element D is inactivated until the source of the deficiencies is determined and corrective actions are taken to repair the problem in processing element D.

As shown in FIG. 1, some embodiments utilize a data base server 18 to offload from the backup server 16 the wafer lot identification information 104 that the backup server 16 receives from the MES 15. The data processor 14 can then retrieve the information 104 from the data base 18 when that information is needed by the data processor 14. In one advantageous embodiment, this offloading of the information 104 to the data base 18 is performed by a copy history processing portion of the data processor 14, designated generally at 14C in FIG. 1. In some embodiments, the copy history processor portion 14C offloads the information 104 to data base 18 once per day.

In another advantageous embodiment, the offloading of the information 104 to data base 18 is performed by a copy history processing portion (not shown) of backup server 16. In this embodiment, backup server 16 is coupled directly to data base 18 and sends the information 104 to data base 18 through a data line (not shown in FIG. 1).

In an alternate advantageous embodiment of the invention, a single data processor (not shown) having sufficient processing power and computer memory could be employed to perform the functions of data processor 14, MES 15, backup server 16, and data base 18.

The data processor 14 also includes an analyzer processor portion 14A which receives test data from the test data storage server 13 (or directly from the tester 12 in some embodiments), and wafer lot identification information 104 from the database 18 (or directly from MES 15 or backup server 16). The analyzer processor portion 14A performs various analysis functions with respect to the received test data, ultimately producing the aforementioned test data analysis information 103 for use by the MES 15. In some embodiments, the analyzer processor portion 14A executes the analysis functions every five minutes.

The data processor 14 also includes a checking processor portion 14B which periodically checks to be sure that the MES 15 has received test data analysis information 103 for each wafer lot that has been input to the tester 12. For this purpose, the checking processor portion 14B receives at 102 information indicative of all wafer lots for which the MES 15 has received corresponding test data analysis information 103. The checking processor 14B periodically (once per hour in some embodiments) determines whether the MES is missing any information 103 for wafer lots whose information 103 is expected to have already arrived at the MES 15. If the checking processor portion 14B determines that all information 103 expected to be present in MES 15 at that time is in fact present in MES 15, then the checking processor does nothing further, and awaits its next periodic checking operation.

On the other hand, if the checking processor portion 14B determines that some information 103 that is expected to be present in the MES 15 is in fact not present in the MES 15, then the checking processor 14B initiates execution of the test data analysis functions with respect to the test data associated with any wafer lot whose corresponding information 103 is missing from MES 15. In some embodiments, the checking processor portion 14B prompts the analyzing processor portion 14A to perform the test data analysis functions. In other embodiments, the checking processor portion 14B is also capable of performing the test data analysis, and performs these functions itself.

In some embodiments, the components designed generally at 11-18 in FIG. 1 are provided as respective individually addressable components of a suitable local area network (LAN), and the illustrated data communication interfaces among these components are implemented by a suitable LAN protocol.

In an advantageous embodiment of the invention, each of the tools in the fabrication tool facilities 11 is authorized to run only for a specified duration. The duration may be measured in time (e.g., two days) or in the amount of product that is processed (e.g., three wafer lots). The tools receive an authorization message (referred to as a "coupon") from an authorizing agent (e.g., MES 15). A tool that has been previously authorized must receive a new authorization "coupon" before the expiration of its old authorization "coupon" in order to continue to operate beyond the duration that was authorized by the old authorization "coupon."

This feature limits the risk that a tool (or a sequence of tools) will be operated for a lengthy period of time during which defective product is being manufactured. This feature also provides a better control over the product inventory. The tool (or sequence of tools) can be set to manufacture a selected quantity of product. After that quantity of product has been manufactured the manufacturing process is automatically stopped. The tool (or sequence of tools) can be restarted by sending a new authorization "coupon."

Figure 3:
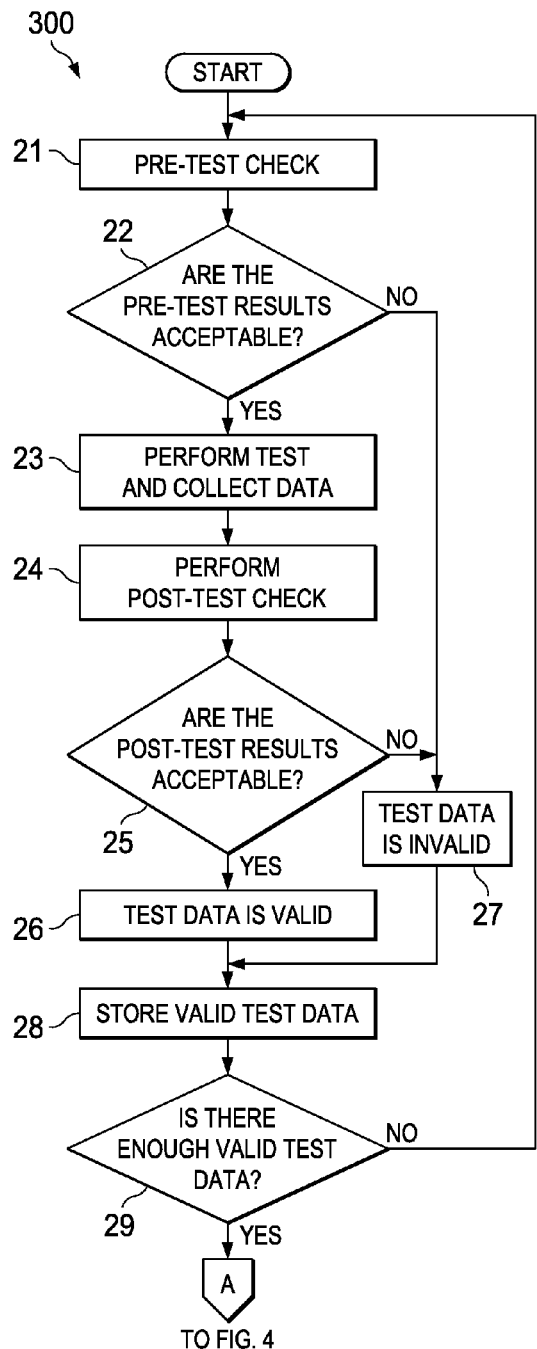
FIG. 3 illustrates exemplary operations according to the invention that can be performed by the apparatus of FIG. 1.
Figure 4:
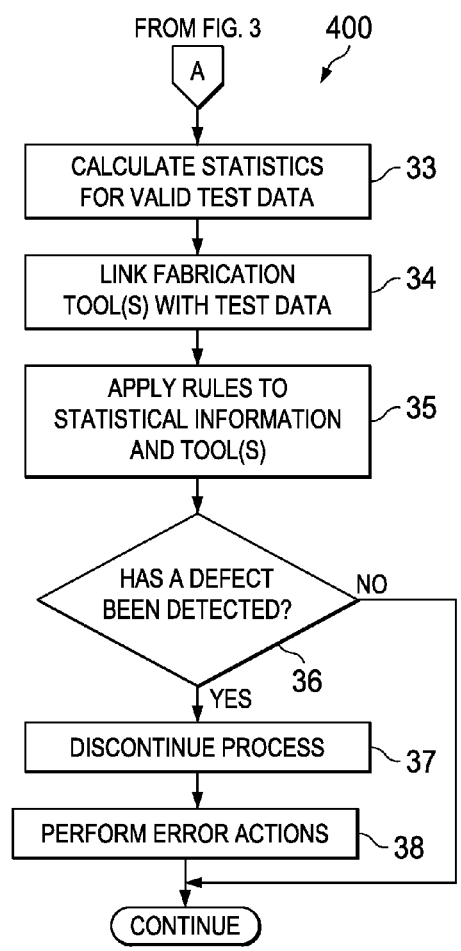
FIG. 4 illustrates further exemplary operations according to the invention that can be performed by the apparatus of FIG. 1.

FIG. 3 and FIG. 4 illustrate exemplary test operations in accordance with the principles of the invention. It is understood that the invention is not limited to the test operations that are illustrated in FIG. 3 and in FIG. 4. It is understood that other types of test operations may also be employed in the invention. In some embodiments, the apparatus of FIG. 1 (e.g., the tester 12) is capable of performing the operations illustrated in FIGS. 3 and 4 in automated fashion, without requiring any manual/human intervention. The operations 300 of FIG. 3 represent a failure test procedure, the general object of which is to stress the structure under test to the point of failure, while also collecting test data indicative of the amount of stress that was required to cause the structure under test to fail. In general, the stress applied to the structure during the testing operation is expected to be adequate to cause the structure to fail.

Referring now to FIG. 3 in more detail, the structure to be tested is submitted to a pre-test check at 21. If at 22, the results of the pre-test check 21 indicate that the structure is not a good, properly operating structure, then testing will not proceed, and test data for that structure is considered to be invalid as indicated at 27. Otherwise, if the results of the pre-test check indicate at 22 that the structure is a good, properly operating structure, then testing is performed at 23, and associated test data is collected. More specifically, the structure is stressed at 23 to an extent that it will be expected to fail as a result of that stress, and the stress level at which the failure occurs is recorded. After the test procedure at 23, a post-test check 24 is performed to determine whether the structure is still a good, properly operating structure. If the structure is determined at 25 to be a good, properly operating structure, then the failure did not occur as expected, and the test data is considered invalid at 27. On the other hand, if the structure is determined at 25 not to be a good, properly operating structure, then the test data collected at 23 is considered valid at 26.

At 28 the valid test data that has been collected at 23 is stored (e.g., in data storage server 13 of FIG. 1). At 29 a determination is made whether there is enough valid test data. If there is not enough valid test data, then the operations described above at 21-27 can be repeated until a sufficient number of structures in the wafer lot have been tested. If there is enough valid test data, the control of the process passes to step 33 in FIG. 4.

The various operations illustrated in FIG. 3 will now be specifically described with respect to the testing of a structure such as a capacitor. In the case of testing a capacitor, the pre-test check procedures at 21 and 22 can include, for example, applying a normal operating voltage to the capacitor and observing the response of the capacitor. The testing and data collection operations at 23 can be, for example, gradually increasing a charge stored in the capacitor, recording the cumulative amount of charge required to cause catastrophic breakdown of the capacitor, and also recording the voltage that is being applied when the breakdown occurs. The post-test checking operations at 24 and 25 are generally the same as those described above at 21 and 22. As described above, the valid test data stored at 28 can include data such as the cumulative charge required to cause catastrophic breakdown of the capacitor, and the voltage that was being applied to the capacitor at the point of breakdown.

As previously mentioned, the control of the test process passes from step 29 of FIG. 3 to step 33 of FIG. 4. In some embodiments, the apparatus of FIG. 1 can perform the operations 400 illustrated in FIG. 4 in automated fashion, without requiring any manual/human intervention. First the statistics for the valid test data are calculated at 33. Thereafter, at 34, the fabrication tool(s) most closely linked with the testing that has been performed is/are identified. At 35, predetermined rules are applied with respect to the statistical information calculated at 33 and the fabrication tool(s) identified at 34. It is then determined at 36 whether the application of the rules at 35 indicates that the tested structure is defective. If so, the semiconductor manufacturing process that produced the wafer lot is discontinued at 37, and a suite of error actions is implemented at 38.

Referring again to the aforementioned example of testing a capacitor, the statistical calculations performed at 33 can be, for example, calculation of the mean value for the cumulative charge at breakdown, the number of failures over which the mean value of the cumulative charge has been calculated, the mean value of the voltage at breakdown, and the number of failures over which the mean value of breakdown voltage has been calculated. General procedures for identifying the fabrication tool(s) most closely linked to a given test of a given structure are well within the skill of workers in the art. In some embodiments, this link identification (see also 34 in FIG. 4) is performed by the analyzer processing portion 14A of FIG. 1 using suitably pre-programmed lookup tables. In some embodiments, the operations illustrated at 29 in FIG. 3 and at 33-34 in FIG. 4 are performed by the analyzer processing portion 14A of the data processor 14, except for the additional testing at 21-29, which the analyzer processing portion 14A can request from tester 12 (see e.g., request 105 in FIG. 1).

Applying rules with respect to the test data statistics and the fabrication tools linked to the test is generally a known process in the art. In some embodiments, the MES 15 is programmed with appropriate algorithms for applying rules (e.g. SPC rules) to interpret whether the test statistics can be considered to indicate a defect, given a particular tool to which the test is linked. For the example of a capacitor, rules can be applied to determine, for example, whether the mean cumulative charge at breakdown is too high or too low, in view of the tool(s) most closely linked to the capacitor breakdown test.

In some embodiments the suite of error actions at 38 can include, for example, any one or more of the following: email notifications; paging notifications; or initiation of a predetermined out-of-control action plan.

As described above, exemplary embodiments of the invention provide for an automated feedback control operation which can, as necessary, effectuate a discontinuance of any given wafer fabrication manufacturing process in response to test data obtained from testing a wafer lot associated with that manufacturing process. Moreover, the entire feedback control operation is effectuated automatically and without human intervention, thereby permitting discontinuance of the manufacturing process at a substantially earlier point in time than can be accomplished when human intervention is required as in the prior art. The control information fed back to the fabrication tool effectively provides a gate-keeping, disabling function so that an implicated manufacturing process can be automatically disabled whenever it is determined that a wafer lot produced by that process is defective. Thus, the decision of whether or not to discontinue a given wafer manufacturing process is basically shifted from the human domain of the wafer fabrication personnel to the automated domain of the automated feedback control loop described above with respect to FIGS. 1-4.

Although exemplary embodiments of the invention have been described above with respect to fabrication tool facilities which implement semiconductor wafer manufacturing processes, it will be apparent to workers in the testing and manufacturing arts that the above-described feedback control principles according to the invention have wide application to the testing and manufacturing arts in general.

Although the present invention has been described with exemplary embodiments, various changes and modifications may be suggested to one skilled in the art. It is intended that the present invention encompass such changes and modifications as fall within the scope of the appended claims.

What is claimed is:

1. A method comprising:

receiving electrical test result information about a structure produced on a semiconductor wafer by a semiconductor wafer manufacturing process at a manufacturing execution system, wherein the manufacturing execution system is configured to track a plurality of events in a fabrication tool facility with an identifier for the semiconductor wafer and a list of fabrication tools used to manufacture the structure on the semiconductor wafer;

determining from the electrical test result information whether the structure is defective using the manufacturing execution system; and in response to a determination that the structure is defective, discontinuing the semiconductor wafer manufacturing process and determining at least one fabrication tool related to the defective structure by comparing a first plurality of fabrication tools associated with a correctly fabricated wafer lot and a second plurality of fabrication tools associated with a deficient wafer lot to determine a difference in fabrication tools, wherein the manufacturing execution system is configured to make at least one of the fabrication tools related to the defective structure to be unavailable to the semiconductor wafer manufacturing process.

2. The method of claim 1, wherein determining whether the structure is defective comprises, automatically and without human intervention, analyzing the test result information to determine whether the test result information is valid.

3. The method of claim 2, further comprising:
automatically and without human intervention, determining from the test result information that a specific tool used in the semiconductor wafer manufacturing process has malfunctioned.

4. The method of claim 3, wherein the discontinuing comprises, automatically and without human intervention, making the specific tool unavailable to the semiconductor wafer manufacturing process.

5. The method of claim 1, further comprising:
automatically and without human intervention, determining from the test result information that a malfunction has occurred in one of: at least one of the fabrication tools used in the semiconductor wafer manufacturing process and at least one sequence of fabrication tools used in the semiconductor wafer manufacturing process.

6. The method of claim 5, wherein the discontinuing comprises, automatically and without human intervention, making unavailable to the semiconductor wafer manufacturing process one of: the at least one fabrication tool and the at least one sequence of fabrication tools used in the semiconductor wafer manufacturing process.

7. The method of claim 6, further comprising:
permitting one of: the at least one fabrication tool and the at least one sequence of fabrication tools to continue to be used in other semiconductor wafer manufacturing processes.

8. The method of claim 6, wherein the making comprises, automatically and without human intervention, making unavailable to the semiconductor wafer manufacturing process every tool that is associated with the malfunction.

9. The method of claim 1, further comprising:
automatically and without human intervention, and at a point in time after determining whether the structure is defective is expected to have been completed, determining whether the test result information has been received but the determination of whether the structure is defective has not been completed.

10. The method of claim 9, further comprising:
automatically and without human intervention, prompting performance of the determination of whether the structure is defective in response to a determination that the test result information has been received but the determination of whether the structure is defective has not been completed.

11. The method of claim 10, wherein the receiving comprises storing the test result information, and wherein the prompting includes, automatically and without human intervention, retrieving the stored test result information.

12. The method of claim 1, further comprising:
receiving test result information about a plurality of structures produced on respective semiconductor wafers by respective semiconductor wafer manufacturing processes;
performing the determination of whether the structure is defective with respect to each of the structures;
performing discontinuing with respect to each of the structures; and
automatically and without human intervention, periodically selecting a current group of the structures for which the determination is expected to have been completed, and determining whether, for any of the currently selected group of structures, the corresponding test result information has been provided but the determination of whether the structure is defective has not been completed.

13. The method of claim 12, further comprising:
automatically and without human intervention, prompting performance of the determination of whether the structure is defective with respect to any of the currently selected group of structures for which it is determined that the corresponding test result information has been provided but the determination of whether the structure is defective has not been completed.

14. The method of claim 1 further comprising the step of:
automatically and without human intervention, discontinuing the semiconductor wafer manufacturing process upon expiration of a duration specified in an authorization message that has authorized an operation of the semiconductor wafer manufacturing process.

* * * * *